(12) United States Patent
Kangastupa et al.

(10) Patent No.: US 9,701,581 B2
(45) Date of Patent: Jul. 11, 2017

(54) METHOD AND APPARATUS FOR PROCESSING SUBSTRATES USING A LASER

(75) Inventors: Jarno Kangastupa, Tampere (FI); Tiina Amberla, Tampere (FI)

(73) Assignee: Corelase Oy (FI)

( * ) Notice: Subject to any disclaimer, the term of this patent is extended or adjusted under 35 U.S.C. 154(b) by 445 days.

(21) Appl. No.: 13/375,499

(22) PCT Filed: Jun. 4, 2009

(86) PCT No.: PCT/FI2009/050474
§ 371 (c)(1),
(2), (4) Date: Dec. 1, 2011

(87) PCT Pub. No.: WO2010/139841
PCT Pub. Date: Dec. 9, 2010

(65) Prior Publication Data
US 2012/0067858 A1    Mar. 22, 2012

(51) Int. Cl.
*B23K 26/00* (2014.01)
*C03C 23/00* (2006.01)
(Continued)

(52) U.S. Cl.
CPC ...... *C03C 23/0025* (2013.01); *B23K 26/0624* (2015.10); *B23K 26/244* (2015.10);
(Continued)

(58) Field of Classification Search
CPC .............. B23K 26/006; B23K 26/0057; B23K 26/0635; B23K 26/246; B23K 26/3266;
(Continued)

(56) References Cited
U.S. PATENT DOCUMENTS 7,008,861 B2 *   3/2006   Andrews et al. ............. 438/463
7,154,930 B2 *  12/2006   Ohtsuka et al. ................ 372/75
(Continued)

FOREIGN PATENT DOCUMENTS

JP     2003001446 A    1/2003
JP     2006255789 Y    9/2006
(Continued)

OTHER PUBLICATIONS

Machine translation of WO 2007/022948 A2, Lubatschowski et al. Mar. 1, 2007, Apparatus and method for separation of materials with laser pulses, 5 pages.*
(Continued)

*Primary Examiner* — Quang D Thanh
*Assistant Examiner* — Kuangyue Chen (57) ABSTRACT

The invention relates to a method and apparatus for processing substrates, such as glass and semiconductor wafers. The method comprises directing to the substrate from a laser source a plurality of sequential focused laser pulses having a predetermined duration, pulsing frequency and focal spot diameter, the pulses being capable of locally melting the substrate, and moving the laser source and the substrate with respect to each other at a predetermined moving velocity so that a structurally modified zone is formed to the substrate. According to the invention, the pulse duration is in the range of 20-100 ps, pulsing frequency at least 1 MHz and moving velocity adjusted such that the distance between successive pulses is less than 1/5 of the diameter of the focal spot. The invention can be utilized, for example, for efficient dicing, scribing and welding of materials which are normally transparent.

18 Claims, 6 Drawing Sheets

(51) Int. Cl.

| | | |
|---|---|---|
| *B28D 5/00* | (2006.01) | |
| *C03B 33/02* | (2006.01) | |
| *C03B 33/08* | (2006.01) | |
| *B23K 26/244* | (2014.01) | |
| *B23K 26/0622* | (2014.01) | |
| *B23K 26/32* | (2014.01) | |
| *B23K 101/40* | (2006.01) | |
| *B23K 103/00* | (2006.01) | |

(52) U.S. Cl.
CPC .......... *B23K 26/32* (2013.01); *B28D 5/0011* (2013.01); *C03B 33/0222* (2013.01); *C03B 33/082* (2013.01); *B23K 2201/40* (2013.01); *B23K 2203/50* (2015.10); *Y02P 40/57* (2015.11)

(58) Field of Classification Search
CPC .......... B23K 2201/40; C03C 23/0025; C03B 33/0222; C03B 33/082; B28D 5/0011
USPC .......... 219/121.67, 121.68, 121.69, 121.72, 219/121.61, 121.77, 121.86; 438/416, 438/462, 463; 225/2; 372/6
See application file for complete search history.

(56) References Cited

U.S. PATENT DOCUMENTS

| | | |
|---|---|---|
| 2005/0090077 A1 | 4/2005 | Nagai et al. |
| 2005/0199599 A1* | 9/2005 | Li et al. ............... 219/121.85 |
| 2005/0274702 A1* | 12/2005 | Deshi ................... 219/121.72 |
| 2006/0169677 A1 | 8/2006 | Deshi |
| 2006/0207976 A1* | 9/2006 | Bovatsek et al. ........ 219/121.69 |
| 2007/0035692 A1 | 2/2007 | Shigematsu et al. |
| 2007/0051706 A1 | 3/2007 | Bovatsek et al. |
| 2007/0090100 A1 | 4/2007 | Yonai et al. |
| 2007/0199927 A1 | 8/2007 | Gu et al. |
| 2007/0201125 A1* | 8/2007 | Blau et al. ................. 359/326 |
| 2007/0207594 A1* | 9/2007 | Tamura ..................... 438/463 |
| 2008/0116181 A1* | 5/2008 | Wu et al. ............... 219/121.72 |
| 2008/0170291 A1* | 7/2008 | Nakamae et al. ........... 359/362 |
| 2009/0045179 A1 | 2/2009 | Williams |

FOREIGN PATENT DOCUMENTS

| | | | |
|---|---|---|---|
| JP | 2008015352 | 1/2008 | |
| JP | 20070076069 | 10/2008 | |
| JP | 2008276057 | 11/2008 | |
| JP | 20070045675 | 2/2010 | |
| WO | WO2005107999 Y | 11/2005 | |
| WO | WO 2007/032453 | 3/2007 | |
| WO | WO 2007022948 A2 * | 3/2007 | ............ B23K 26/06 |
| WO | WO2007252948 Y | 3/2007 | |

OTHER PUBLICATIONS

Gillner, et al.; "Laser Bonding of Micro Optical Components"; Proceedings of SPIE vol. 4941 (2003).

* cited by examiner

METHOD AND APPARATUS FOR PROCESSING SUBSTRATES USING A LASER

FIELD OF THE INVENTION

The invention relates to processing, such as cutting, dicing and welding of materials and substrates using laser. In particular, the invention relates to processing of glass and semiconductor substrates, e.g. sapphire, quartz and silicon substrates and the like. The invention also concerns a novel laser apparatus and novel uses of laser sources.

BACKGROUND OF THE INVENTION

Conventionally semiconductor wafers are diced using mechanical sawing after manufacturing of semiconductor structures on the wafer. This technique has the disadvantage that due to the kerf width, a considerable portion of the semiconductor material is wasted as dust. According to some estimates, this means at least hundreds, if not thousands of tons of silicon waste annually in the global scale.

Also laser light can be used for dicing of semiconductor wafers after manufacturing of semiconductor structures on the wafer. Generally, in such methods, a cutting line is produced by laser to the wafer after which the wafer is cut along the cutting line. Several methods have been proposed for this.

EP 1338371 discloses a method wherein a pulse laser beam is radiated on a predetermined cutting line on a surface of a workpiece under conditions causing multiple photon absorption. The focal point of the laser is kept inside the workpiece and moved for forming a modified area inside the workpiece. In the publication, there is described a method utilizing Nd:YAG pulsed laser at 100 kHz, the laser having a wavelength of 1064 nm and spot cross-sectional area of $3.14*10^{-8}$ $cm^2$. The pulse width is 30 ns and the moving speed of a mounting table having the object to be processed is 100 mm/s. Thus, laser-induced spots are located in line and next to each other within the substrate.

Gattrass et al. disclose in *Nature Photonics, Vol. 2, April 2008*, pp 219-225 a femtosecond laser micromachining method for transparent materials. The method is aimed at manufacturing waveguides, active optical devices, microfluidic devices and filters and resonators, achieving polymerization, bonding of materials, and performing nanosurgery. In the method, femtosecond-scale laser pulses are directed to the substrate material at a power range causing nonlinear absorption within the substrate. Another method for femtosecond processing is disclosed by Miyamoto et al. in *Journal of Laser Micro/Nanoengineering Vol. 2, No. 1, 2007*.

Miyamoto et al. disclose in *Proceedings of the 4th International Congress on Laser Advanced Materials Processing* a method of local melting of glass material and its application to direct fusion welding. The publication discloses an examples in which picosecond-scale laser pulses are directed to the surface of borosilicate glass and to the interior of fused silica. In the examples, a pulse width of 16 ps with a frequency of 1 kHz were used, the traveling velocity of the substrate being 0.5, 5 or 10 mm/s. On the other hand, pulses having a duration of 10 ps were used at frequencies of 100 and 500 kHz and The publication suggests that the efficiency of fusion welding directly depends on the increase of nonlinear absorption the laser pulses to the substrate. Moreover, it has been suggested that increasing the pulse energy increases nonlinear absorption and thus welding efficiency.

Despite the many advantages of the abovementioned techniques, there is a need for even more efficient laser processing techniques. In particular, increasing the pulse energy is not possible above certain levels due to practical limitations set by the instrumentation and the tolerance of substrate materials of momentary pulse energies. Excessive irradiance will induce shock waves into material and cause micro level cracks.

SUMMARY OF THE INVENTION

It is an aim of the invention to achieve a more powerful method and apparatus for processing substrates. Particular aims are to achieve novel and more efficient laser dicing method and laser welding method for substrates which are normally transparent.

One aim of the invention is to produce laser-induced microstructures, which are of higher quality than those achieved with known methods, in particular with respect to the number of undesired microcracks produced.

The invention is based on the finding that picosecond-scale laser pulses may induce at the substrate, in addition to nonlinear absorption, also considerable linear absorption effect, provided that they are directed to the substrate temporally and spatially frequently enough. That is, if a subsequent pulse is directed to the substrate such that it significantly overlaps with the spot of the previous pulse, the spot still being hot enough, additional absorption of laser energy to the substrate is gained due to linear absorption. In addition to increased absorption, a high pulse repetition rate will reduce microcracking susceptibility of the substrate material(s). This is because a preceding pulse can make the material less rigid and when the succeeding pulse comes the shock wave will be dampened.

The aim of the invention is achieved by the method as hereinafter described and claimed.

In the method according to the invention comprises
  directing to the substrate from a laser source a plurality of sequential focused laser pulses having a predetermined duration, pulsing frequency and focal spot diameter, the pulses being capable of locally melting the substrate,
  moving the laser source and the substrate with respect to each other at a predetermined velocity so that a structurally modified zone is formed to the substrate,
  using a pulse duration of 20-100 ps, and
  using a pulsing frequency and moving velocity adjusted such that the pulses significantly overlap, the distance between successive pulses being less than ⅕ of the diameter of said focal spot. The pulsing frequency is preferably at least 1 MHz.

Thus, a novel pulsed laser exposure scheme is provided for achieving permanent modifications to the substrate.

The abovementioned problem is solved by the invention. This is mainly because at the range of the invention both nonlinear and linear absorption of laser power can be most efficiently utilized, resulting in higher total absorptivity than in known methods. In more detail, the inventors have found that a pulse duration of at least 20 ps is required for maximizing the effect of nonlinear absorption, in particular so-called impact ionization. Nonlinear absorption at such pulse durations is caused both by initial absorption of photons into the substrate material (photoionization) and impact ionization where the number of free charge carriers in the lattice of the material (typically electrons) is multiplicated by direct impact of the charge carriers. Thus, laser radiation energy is efficiently transferred from laser-induced electrons to the lattice of the substrate causing high degree of local heating. Moreover, the inventors have found that by subjecting the same or very nearby region of the substrate to several pulses of this duration, linear absorption takes place. This means that as the target spot is still hot because of the previous pulse at the time of arrival of the subsequent pulse, the material is locally not transparent to the wavelength used but has already initially significant absorptivity, ie. high number of free charge carriers. In other words, because of the previous pulses, the number or electrons in the conduction band is very high and the material appears as metal-like target having high absorptivity for the laser radiation.

An additional advantage of the described processing scheme is that lower peak power of laser light (typically less than $10^{12}$ W/cm$^2$) can be utilized, the average power still being higher or at least at the same level as in known methods. Thus, a laser-induced shock wave cause by each individual pulse is followed by a significant thermal wave contributed by subsequent pulses directed to the immediate vicinity of the impact zone of the pulse. One benefit of this is that local cracks caused by individual pulses are automatically repaired as the melting effect in the vicinity is high. Thus, the structurally modified zone resulting from the processing according to the invention is consistent and of high quality.

The apparatus according to the invention for processing substrates by laser light comprises
- a pulsed laser source for emitting laser pulses having a predefined duration, pulsing frequency and focal spot diameter,
- means for holding a substrate such that laser light can be guided from the pulsed laser source to the substrate,
- means for moving the substrate with respect to the pulsed laser source with a predefined velocity.

According to the invention, the pulse duration of the pulsed laser source can be adjusted to 20-100 ps, and the pulsing frequency and relative moving velocity of the substrate and the laser source can be adjusted such that successive pulses significantly overlap at the substrate, the distance between successive pulses being less than ⅕ of the diameter of said focal spot. In particular, the pulsed laser may be a fiber laser.

The invention can be used for processing substrates which are in their normal state totally or partly transparent at the wavelength used. This is because in practice impurities or lattice defects of the material initiate the photoionization process and further the impact ionization process. It is to be noted that so-called multiphoton absorption, which plays a key role in processing substrates by shorter pulses, in particular by femtosecond-scale pulses, does not significantly take place and is not even necessary or desired in the present method.

In particular, the invention is usable for glass and/or semiconductor substrates, such as a Silicon, technical glasses such as quartz, fused silica, borosilicate, lime glass, temperature expansion co-efficient tuned glasses, sapphire, ceramics such as zirconium oxide, LiTaO etc. and combinations of these materials The method according to the invention has found to yield processed substrates having low amount of microcracks within the processed materials and thus high bending strength of processed components (in particular in cutting and dicing applications). No waste is produced in cutting as the kerf width is practically zero. As compared with mechanical cutting, the processing quality is constant in time also as there is no tool wear.

The invention can be industrially used for producing locally weakened cutting lines to glass or semiconductor substrates, for example for dicing wafers to produce individual electrical or optical components.

In addition, the invention can be used for locally removing circuits or other micromachined structures or even whole layers from substrates.

Finally, the invention can be utilized for efficient and pinhole-free welding of two transparent material layers together.

In this document, the term "substrate" means broadly any target material or material combination in which structural changes take place when processed using the present method. The substrate may be substantially homogeneous or it may comprise a plurality of regions or layers made from different materials. The regions or layers may initially be connected or unconnected, as is the case in welding applications. The processing may be directed to one individual layer or region or to the interface of two or more layers or regions, depending on the desired effect.

The term "substrate" also covers entities which comprise a base material layer and a small component which is intended to be welded to the base material layer (e.g. an optical or microfluidic component which is to be welded to a semiconductor or glass wafer).

Further embodiments and advantages of the invention are described in the following detailed description with reference to the attached drawings.

DETAILED DESCRIPTION OF EMBODIMENTS

The invention comprises producing to a substrate structurally modified lines using pulsed laser having a pulse duration of at least 20 ps and a pulsing frequency which is matched with processing velocity such that a plurality of the pulses synergistically increase absorption within the substrate. In particular, if the distance between successive pulses is less than ⅕ of the diameter of the focal spot of the laser beam, many enough pulses arrive to a very local region of the substrate such that the synergetic effect is ensured. In typical applications, the focal spot diameter is in the range of 1-10 μm, resulting in a typical maximum distance between pulses the range of 200 nm-2 μm.

According to one embodiment, the pulse duration used is at least 25 ps.

According to one embodiment, the pulsing frequency is increased or the moving velocity is decreased such that the distance between successive structurally modified spots is less than ¹⁄₁₀, preferably less than ¹⁄₂₀ of the diameter of said focal spot. This further increases the liner absorption effect taking place in the substrate and aids in achieving a more homogeneous processing line.

Figure 5A:
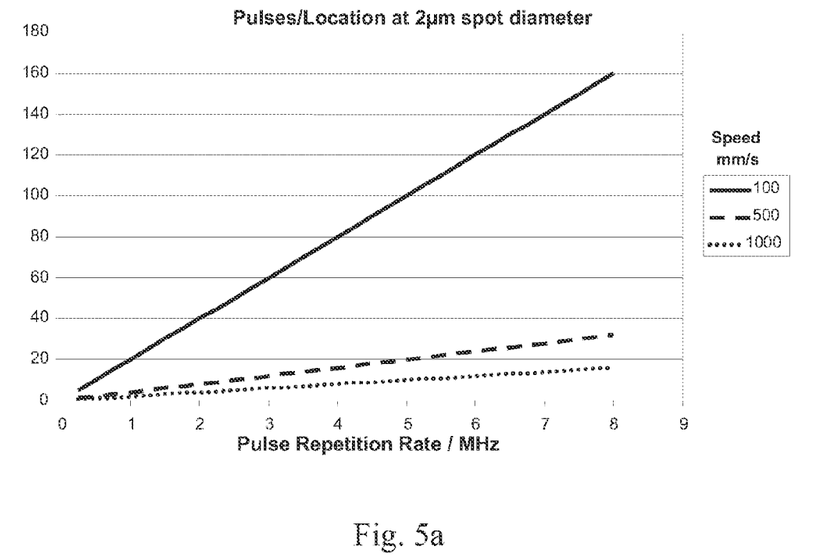
FIGS. 5a and 5b show diagrams of laser pulses at each location as a function of frequency for two different focal spot diameters.
Figure 5B:
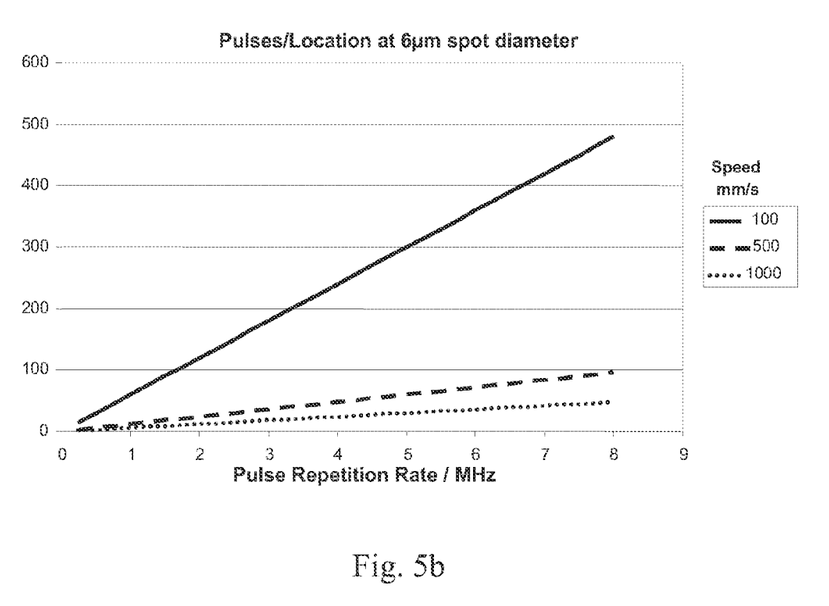

Generally, the percentage of overlap of successive pulses can be characterized by the formula (1−(processing speed* (time between pulses)/focal spot diameter)). FIGS. 5a and 5b show the number of pulses hitting each location of the substrate calculated with the aid of this formula for 2 μm and 6 μm spot diameters, respectively, and for three exemplary processing speeds, as a function of processing frequency. It can be seen that, The processing frequency is preferably at least 2 MHz and it may be up to 20 MHz and even more. The inventors have found that a frequency of this scale is beneficial for maximally taking advantage of linear absorption, due to thermal time constants of the substrate and the resultant temporal decrease of the number of free carriers after each pulse. It is noted that only repetition rate high enough can utilize the residual heat of a previous pulse and thus the increased number of free charge carriers. Thus, only increasing pulse overlap by decreasing processing speed does not help if the period between pulses is too long. In addition, at high frequencies the processed volume has been found to be confined more evenly and also process control can be greatly improved.

According to a preferred embodiment, the processing frequency is at least 4 MHz. This is beneficial as the average power can be reduced using higher frequencies. This is of particular importance in e.g. sapphire processing.

The peak pulse power that is required for initiating the melting process in practically transparent glass or semiconductor substrates is less than $10^{12}$ W/cm². Typically, the peak power used is $10^{10}$-$10^{12}$ W/cm², in particular $10^{10}$-$5*10^{11}$ W/cm². This is significantly less than that is required in femtosecond pulse processing or multiphoton absorption processing methods and has the consequence that the number of laser-induced defects is greatly reduced.

According to a preferred embodiment, the wavelength used is in the near infrared range, i.e. 0.75-1.4 μm. This range has been proven to be suitable not only for silicon processing, but also for high band gap materials such sapphire and quartz, which are difficult to process at least in any industrial way using known low-frequency and/or femtosecond—scale processing methods.

According to one embodiment nonpolarized laser light is used. This causes the electromagnetic field direction in the substrate to be arbitrary and makes the method more immune of the lattice parameters of the substrate. In other words, nonpolarized light has been found to be effective for a wider variety of substrates.

Figure 6:
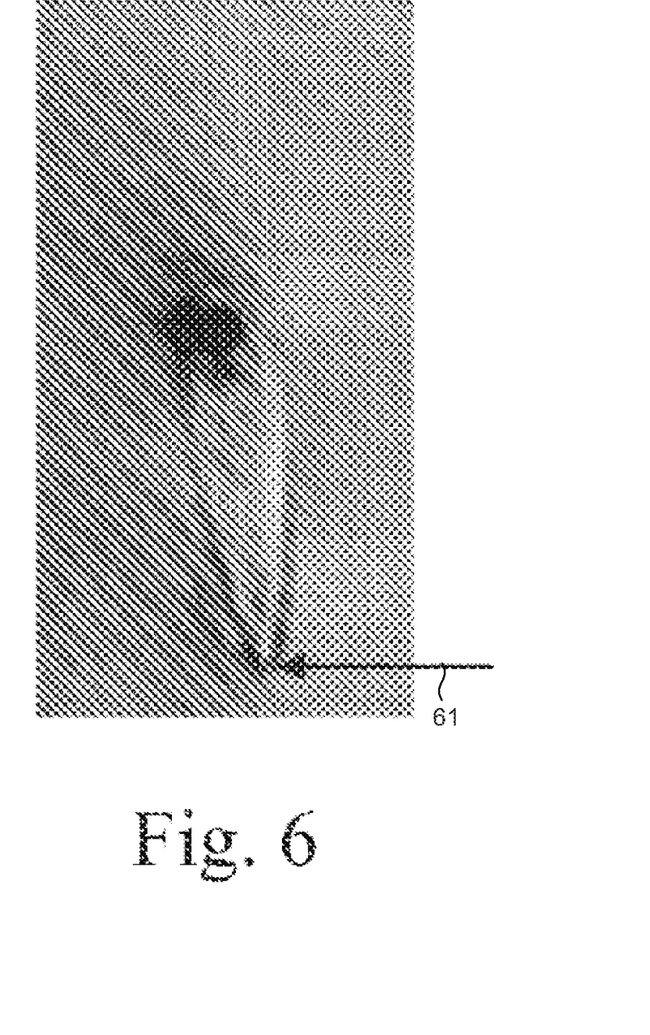
FIG. 6 shows a cross-sectional image of a microstructure processed according to the invention to a glass substrate.

FIG. 6 shows a cross-sectional image of a microstructure processed according to the invention to a glass substrate. The laser has been directed to the substrate from above and the melting process has initiated at the tapered end (see arrow 61) of the feature shown. It can be seen that a pulse having a duration of 20 ps or more provides a round shape at the initiation point, contrary to shorter pulses, in particular sub-ps pulses, having sharp initiation points and high cracking probabilities in the vicinity of the initiation point. It can also be seen that the diameter of the resulting feature in glass is so wide that power density is not enough for multiphoton absorption and that the linear absorption effect strengthens towards the upper portion of the feature.

According to a preferred embodiment, the laser source used is a fiber laser source. Fiber lasers have the advantage that they are capable of producing light at the megahertz frequency range, which has been found to be the most interesting as regards both processing speed and quality, as discussed above. Fiber lasers in this context mean lasers in which the active gain medium is a doped optical fiber. The doping can be achieved with rare-earth elements such as erbium, ytterbium, neodymium, dysprosium, praseodymium, and thulium.

INDUSTRIAL APPLICATIONS

The various aspects of the invention can be used for several industrial purposes, in particular the manufacture and packaging of integrated circuits, manufacturing of display panels, bonding of components, microstructuring, microfluidistics, lab-on-a-chip technology, surface modification, manufacturing micro-scale waveguides, Some non-limiting examples of the applications are given below.

Dicing

According to one embodiment, the invention used for dicing substrates. Dicing by focusing laser light to the interior of a substrate for producing local stress areas to the substrate, and by a following separation of the parts of the substrate along the stress areas, is also called stealth dicing in the art. The key of the method is that the stresses induced to the interior of the material mechanically weaken the material such that it is easy to break. Consequently, practically no silicon or glass waste is produced, in contrast to conventional sawing methods.

The present invention has the advantage that very high processing speeds can be achieved in dicing due to the efficient laser exposure scheme.

Figure 1:
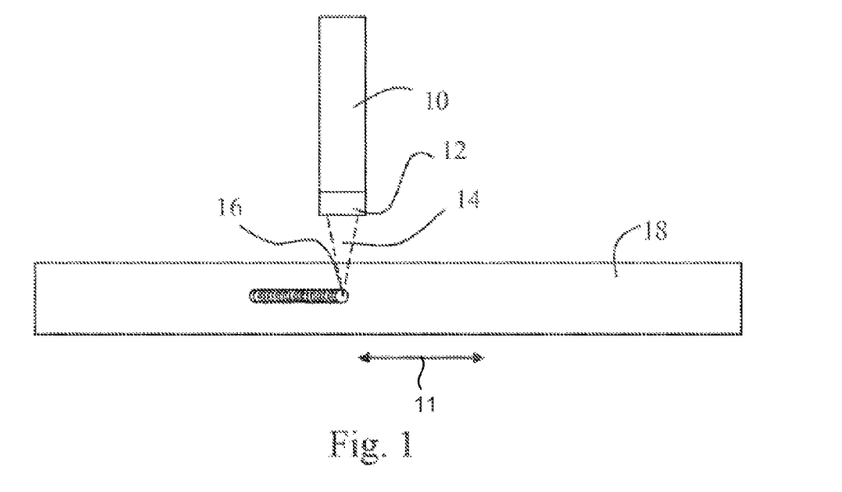
FIG. 1 shows a schematic side view of processing cutting lines to a substrate according to one embodiment of the invention.
Figure 3:
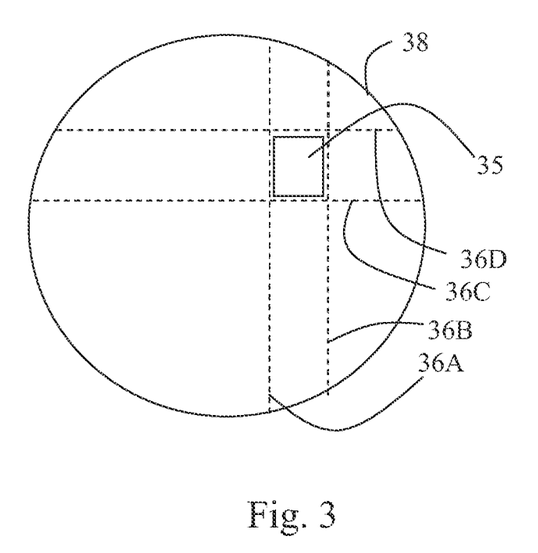
FIG. 3 shows a schematic view of dicing application.

FIG. 1 (not in scale) shows the principle of stealth dicing using the present invention. A laser source 10 and optics 12 are used for producing and focusing a laser light beam 14 to the inner part of a substrate 18, The plurality of overlapping pulses applied to a moving substrate in direction 11 give rise to a structurally modified cutting line 16 within the substrate 18 according to the principle described above. FIG. 3 (not in scale) shows a wafer 38 with a plurality of wafer-long cutting lines 36A-36D, outlining a component 35 to be diced from the wafer 38. After the desired cutting lines have been formed, the portions of the wafer can be separated with any suitable method, such as cracking by bending.

The invention is particularly suitable for cutting silicon crystal wafers and other semiconductor materials used in the fabrication of integrated circuits and other microdevices. The wafer may contain microelectronic devices built in and/or over the wafer by any known microfabrication process such as doping, ion implantation, etching, deposition, and photolithographic patterning.

Particular advantages are achieved with very thin wafers (e.g. <200 μm, in particular <100 μm), which are used, for example, for manufacturing display panels (e.g. LCD panels and (O)LED panels). However, the invention can in principle be used for wafers of any thicknesses.

Scribing

According to one embodiment, the invention is used for scribing a substrate. In the scribing process, the beam is focused to the vicinity of a surface of the substrate in order to produce a groove to the surface of the substrate. Scribing by the present method is particularly advantageous for very thin substrates (typically having a thickness less than 100 μm) being too weak to be processed mechanically. The resulting scribe depth is typically at maximum 15% of the total thickness of the substrate.

Surface Modification or Internal Layer Modification

According to one embodiment, the invention is used for removal or permanent modifying of material layers of the substrate. According to an example, a top layer or several top layers of a substrate can be heated according to the invention and their internal structure destroyed. The destroying may comprise volatilizing some or all components of the layers or physically and/or chemically modifying their internal structure. For example, the substrate may comprise a reflective (metal) layer which prevents stealth dicing to be carried out and by means of the invention this reflective layer is removed. The same principle can be used for local destroying of microfabricated circuitry contained on the surface layers of the substrate.

According to one embodiment, the invention is carried out as a two-step process. In the first step, a specific material layer or a plurality of reflective material layers is/are destroyed using the laser exposure scheme according to the invention. In the second step, the substrate is diced using the laser exposure scheme according to the invention. This embodiment has the advantage that the dicing laser can be directed to the wafer from its front side, whereas conventional stealth-dicing has been performed from the back side of the wafer, thus requiring an additional and risky step of turning the wafer.

Welding

According to one embodiment, the invention is used for welding of material layers permanently together. In this application, the substrate comprises at least two superimposed layers having an interface zone, the method comprising focusing the laser pulses to said interface zone for achieving local melting at the interface zone and for welding the layers together through re-solidification.

Figure 2:
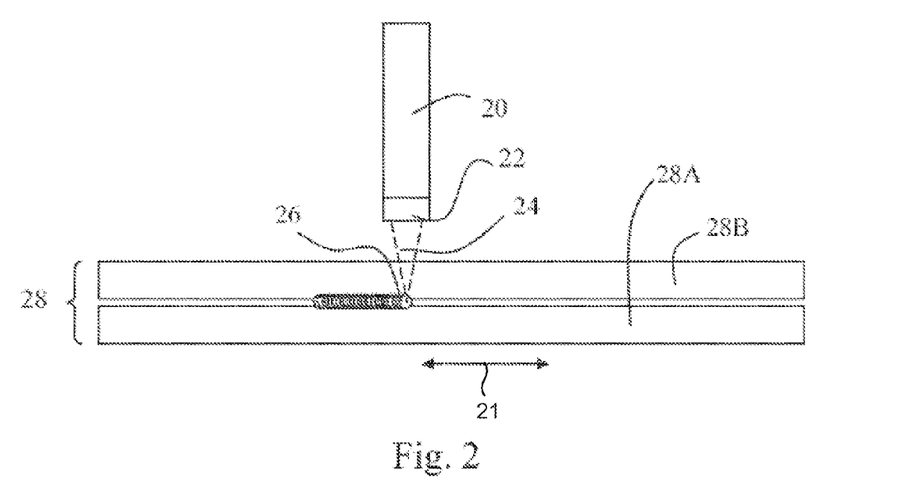
FIG. 2 shows a schematic side view of welding according to one embodiment of the invention.

The welding application is schematically illustrated in FIG. 2. In the method, a laser source 20 and optics 22 are used for producing and focusing a laser light beam 24 to the interface of two separate layers 28A and 28B of a substrate 28. The plurality of overlapping pulses applied to a moving substrate in direction 21 give rise to a weld seam 26 connecting the layers 28A and 28B according to the principle described above.

Figure 4A:
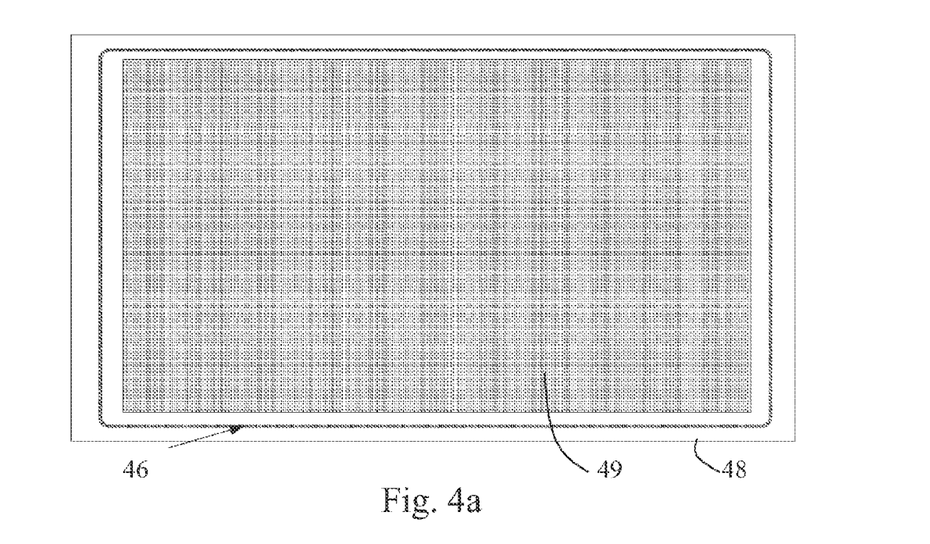
FIGS. 4a-4d illustrate welding of an (O)LED display panel according to one embodiment of the invention.
Figure 4B:
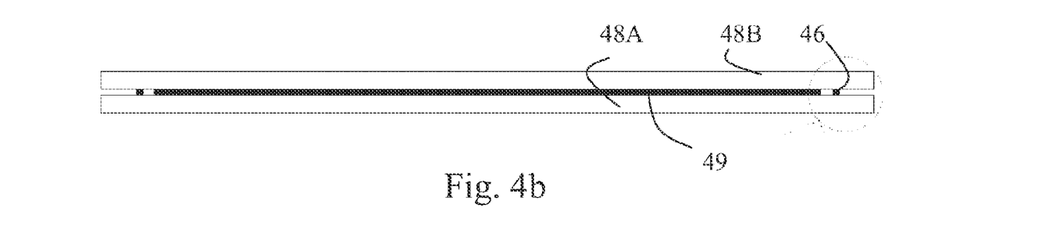

According to one example, the substrate comprises two superimposed glass panels which are welded together at the fringe areas of the panels by a contiguous seam. Thus, for example display panels or light sensing panels can be manufactured using the present method. FIGS. 4a and 4b show an example of manufacturing an OLED display panel. The panel 48 comprises a base layer 48A comprising an active layer 49 having an array of individual light-emitting units and a front glass layer 48B. Initially, the layers 48A and 48B are placed on top of each other such that the active layer 49 remains between them. After that, the present invention is used for producing a welded seam 46 around the whole active layer. Preferably, the welded seam is unbroken (contiguous). Thus, an effective barrier against dust and humidity can be formed for the active layer, at the same time efficiently affixing the layers of the panel together without any additional components, such as adhesives. Due to the frequent pulsing and complete melting and re-solidification of the glass layers, the seam is very impermeable.

Figure 4C:
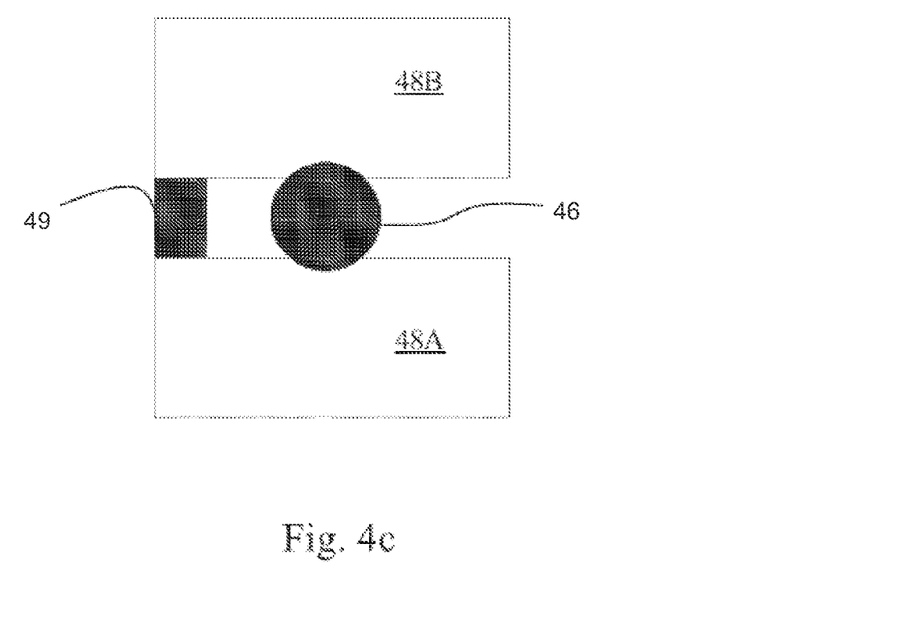
Figure 4D:
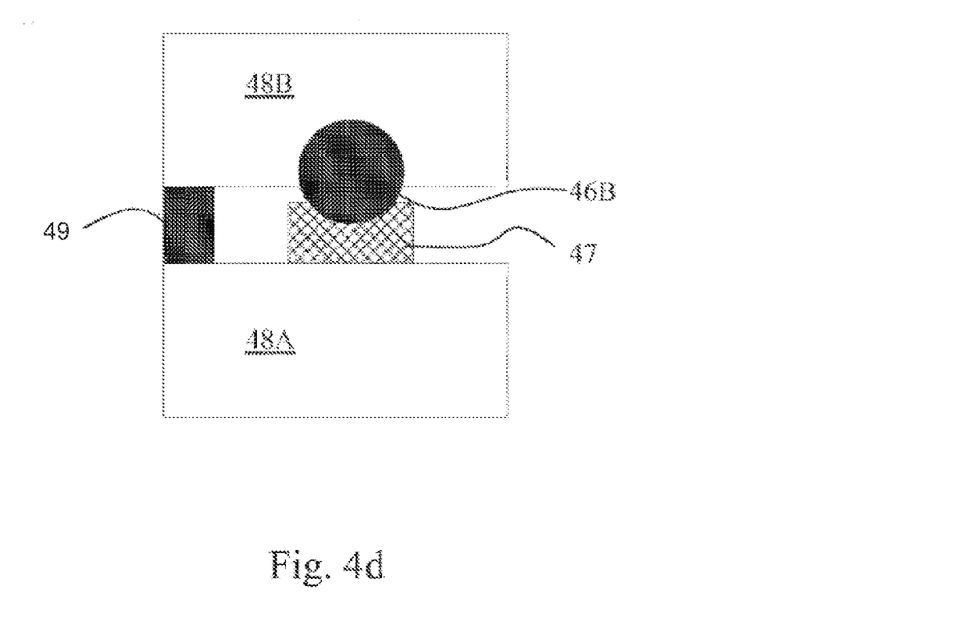

FIGS. 4c and 4d show alternative detailed embodiments of the above application. In the process of FIG. 4c, the glass layer 48A and 48B are spaced from each other at the interface zone. In the process of FIG. 4d, an additional bridging layer 47 is provided between the glass layers 48A and 48B. The bridging layer 47 decreases the free distance between the glasses and ensures that compete unification of the layers takes place. The weld seam 46B is thus produced between the bridging layer and the front glass 48B. The bridging layer 47 can be a metal layer.

In addition to manufacturing display panels, the present welding method can be used for wafer level packaging (see below), temperature sensitive component packaging, integration of optical components and integration of microfluidistic components.

Wafer Level Packaging

According to one embodiment, the invention is used for making joints between silicon wafer and other material by welding. The other material may be mechanically protective and/or electrically isolating material. Thus, the invention is suitable for wafer level packaging (WLP) applications, where packages are manufactured for silicon components while still being part of a larger wafer, instead of the traditional process of assembling the package of each individual unit after wafer dicing. For example, a multi-component wide protective layer can be brought onto a still undiced silicon wafer and the present laser exposure scheme used for welding the protective layer and the components of the wafer together.

The above-described embodiments and examples and the attached drawings are given for illustrative purposes and are intended to be non-limiting. The scope of the invention is defined in the following claims which are to be interpreted in their full breadth and taking equivalents into account.

The invention claimed is:

1. A method of dicing a substrate comprising:
   directing, from a laser source to the substrate, a plurality of sequential focused laser pulses consisting of non-polarized light and having a wavelength of 0.75 µm, a pulsing frequency of at least 1 MHz and a predetermined focal spot diameter, the pulses being capable of locally melting the substrate,
   moving the laser source and the substrate with respect to each other at a predetermined moving velocity so that a weakened cutting line of a structurally modified zone of melted and re-solidified substrate is formed to the substrate,
   the predetermined moving velocity adjusted such that the pulses significantly overlap, a distance between successive pulses being less than ⅕ of the diameter of said focal spot and focusing the laser pulses solely to an interior of the substrate, whereby a weakened cutting line inside the substrate is formed as said structurally modified zone, and
   dicing the substrate by mechanically separating at least two portions of the substrate defined by said weakened cutting line,
   wherein said laser pulses have a duration of 20-100 ps and said laser pulses are focused at a single depth inside the substrate for forming the weakened cutting line.

2. The method according to claim 1, wherein the distance between successive pulses is less than 1/10 of the diameter of said focal spot.

3. The method according to claim 1, further comprising using a pulsing frequency of at least 2 MHz.

4. The method according to claim 1, further comprising using peak pulse power of less than 1012 W/cm2.

5. The method according claim 1, wherein said laser source is a fiber laser source.

6. The method according to claim 1, wherein the substrate is in its normal state at least partly transparent to the wavelength of the laser light used.

7. The method according to claim 1, wherein the substrate comprises a glass or semiconductor substrate selected from the group of: a quartz, sapphire, silicon and LiTaO3 wafer.

8. The method according to claim 1, wherein the substrate is an LED panel or an LCD panel.

9. The method according to claim 1, wherein;
the substrate comprises at least one of microfabricated circuitry and a reflective layer, and
the method further comprises the step of focusing the laser pulses to said microfabricated circuitry and/or reflective layer for permanent modification of said microfabricated circuitry and/or reflective layer before formation of said weakened cutting line.

10. The method according to claim 1, wherein a thickness of the substrate is 200 µm or less.

11. The method according to claim 1, wherein in each pulse produces on the substrate a feature tapering towards an initiation point of the feature, the feature having a round shape at the initiation point.

12. An apparatus for dicing substrates by laser light comprising:
a pulsed laser source for emitting laser pulses consisting of non-polarized light and having a pulsing frequency of at least 1 MHz and a predefined focal spot diameter,
means for holding a substrate such that laser light can be guided from the pulsed laser source to the substrate,
means for moving the substrate with respect to the pulsed laser source with a predefined velocity so that a weakened cutting line of a structurally modified zone of melted and re-solidified substrate is formed to the substrate, a relative moving velocity of the substrate and the laser source being such that successive pulses significantly overlap at a substrate and the distance between successive pulses being less than ⅕ of the diameter of said focal spot, the pulses being focused solely to an interior of the substrate in order to form the weakened cutting line inside the substrate,
means for mechanically separating at least two portions of the substrate defined by said weakened cutting line,
wherein the laser pulses are adapted to have a duration of 20-100 ps, and
wherein the laser pulses are adapted to be focused to a single depth inside the substrate.

13. The apparatus according to claim 12, wherein the laser source is a fiber laser source.

14. A method of processing a substrate comprising the steps of:
directing to the substrate, from a laser source, a plurality of sequential focused laser pulses consisting of non-polarized light and having a predetermined duration, pulsing frequency and focal spot diameter, said pulses being capable of locally melting the substrate,
moving the laser source and the substrate with respect to each other at a predetermined moving velocity so that a weakened cutting line of a structurally modified zone of melted and re-solidified substrate is formed to the substrate,
using a pulse duration of 20-100 ps, and
using a pulsing frequency of at least 1 MHz and the predetermined moving velocity adjusted such that the pulses significantly overlap, a distance between successive pulses being less than ⅕ of the diameter of said focal spot.

15. The method according to claim 14, wherein the substrate comprises at least two superimposed layers having an interface zone, the method comprising focusing the laser pulses to said interface zone for welding the layers together.

16. The method according to claim 15, wherein the substrate comprises two superimposed glass panels which are welded together at the fringe areas of the panels by a contiguous seam.

17. The method according to claim 15, wherein the substrate is an OLED display panel.

18. The method according to claim 15, wherein the substrate comprises a first layer comprising a silicon wafer and a second material comprising another material.

* * * * *